US009221202B2

(12) United States Patent
King, Jr. et al.

(10) Patent No.: US 9,221,202 B2
(45) Date of Patent: Dec. 29, 2015

(54) MAKING TWIST-ON WIRE CONNECTORS

(71) Applicants: Lloyd Herbert King, Jr., Chesterfield, MO (US); James C. Keeven, O'Fallon, MO (US); William Hiner, O'Fallon, MO (US)

(72) Inventors: Lloyd Herbert King, Jr., Chesterfield, MO (US); James C. Keeven, O'Fallon, MO (US); William Hiner, O'Fallon, MO (US)

(73) Assignee: THE PATENT STORE LLC, O'Fallon, MO (US)

( * ) Notice: Subject to any disclaimer, the term of this patent is extended or adjusted under 35 U.S.C. 154(b) by 0 days.

(21) Appl. No.: 14/544,264

(22) Filed: Dec. 16, 2014

(65) Prior Publication Data

US 2015/0151469 A1 Jun. 4, 2015

Related U.S. Application Data

(62) Division of application No. 12/286,976, filed on Oct. 3, 2008, now Pat. No. 8,980,154.

(51) Int. Cl.
*B29C 45/14* (2006.01)
*H01R 4/22* (2006.01)
*H01R 43/18* (2006.01)
*B29L 31/36* (2006.01)

(52) U.S. Cl.
CPC ............ *B29C 45/14639* (2013.01); *H01R 4/22* (2013.01); *H01R 43/18* (2013.01); *B29L 2031/36* (2013.01)

(58) Field of Classification Search
CPC ................................. B29C 45/14; B29C 45/03
USPC ......................................................... 425/542
See application file for complete search history.

(56) References Cited

U.S. PATENT DOCUMENTS

2005/0282428 A1* 12/2005 King, Jr. ....................... 439/415

* cited by examiner

*Primary Examiner* — Alison Hindenlang
*Assistant Examiner* — Xue Liu
(74) *Attorney, Agent, or Firm* — Jacobson & Johnson LLC

(57) ABSTRACT

A method of making a twist-on wire connector including a method of making a sealant containing twist-on wire connector by in situ formation of a shell around the coil wherein a sealant may be injected into a cavity in the coil prior to removing the shell from the mold to form a ready-to-use sealant containing twist on wire connector without further steps outside the mold.

7 Claims, 3 Drawing Sheets

MAKING TWIST-ON WIRE CONNECTORS

CROSS REFERENCE TO RELATED APPLICATIONS

This application is a divisional application of U.S. application Ser. No. 12/286,976 filed Oct. 3, 2008 titled Making Twist-On Wire Connectors.

FIELD OF THE INVENTION

This invention relates generally to twist-on wire connectors and, more specifically, to a mold for making a twist on wire connector and improvements to a process of making twist-on wire connectors including sealant containing twist-on wire connectors.

STATEMENT REGARDING FEDERALLY SPONSORED RESEARCH OR DEVELOPMENT

None

REFERENCE TO A MICROFICHE APPENDIX

None

BACKGROUND OF THE INVENTION

An automated method and apparatus for making sealant containing twist-on wire connectors from basic components is shown in U.S. Pat. No. 5,771,578. The apparatus through use of numerous sensors addresses one of the difficulties in making twist-on wire connectors, which is to ensure that the sealant containing twist-on wire connectors are properly assembled. Typically, the components such as the shell and coil need to be assembled before a sealant can be injected into the coil. Occasionally, the coil or the sealant may not be properly assembled or the coil or the shell may not have been properly formed. In either case the result can be a faulty product. In order to minimize faulty products the U.S. Pat. No. 5,771,578 discloses an automated system that uses a number of optical sensors to detect the presence of components for assembly. A first sensor detects if the shells are being properly fed into the peripheral slots of a rotating table. A second sensor detects if the coils are being properly fed to a rotating assembly table. A third sensor determines if the coil is properly positioned in the shell and a fourth optical sensors determines if the caps are in position. Further optical sensors are used to determine if the coil is properly positioned in the shell. If the optical sensors detect that one or more of the twist-on wire connector components is not present on the assembly table or if the twist-on wire connector does not contain the proper amount of sealant the twist-on wire connector is rejected and is sent to a recycle bin The concept of molding parts such as battery terminals where molten plastic material is molded around a battery lug is known in the art. Typically, a solidified finished part is placed partly in a mold cavity and molten material is then directed into the cavity around the finished part. The molten material is then allowed to solidify thereby embedding a portion of the finished part in the solidified material. Molding around a part is useful for those process where a finished part or a portion of a finished part is placed in the mold cavity, however, it is not well suited if the entire part is to be completely embedded in the molten material.

U.S. Pat. No. 5,151,239 discloses a method of molding with twist-on wire connectors where a housing is molded around the insulating shell of a twist on wire connector. Subsequently a sealant is injected into the cavity of the twist-on wire connector in the molded housing.

SUMMARY OF THE INVENTION

A method and a mold for making a twist-on wire connector including sealant containing twist-on wire connectors by supporting a coil in a mold cavity having the shape of a twist-on wire connector shell so that injecting molten material into mold cavity provides in situ formation of a ready to use twist-on wire connector having a shell surrounding the coil without the need for further assembly steps outside the mold. If a sealant is injected into a cavity in the coil prior to removing the solidified shell from the mold cavity one can obtain a ready-to-use sealant containing twist on wire connector without further assembly steps outside the mold.

DESCRIPTION OF THE PREFERRED EMBODIMENT

FIG. 1 to FIG. 4 show a mold and illustrate a method of making a twist-on wire connector including making a sealant containing twist-on wire connector through an insert molding process. The mold and process described herein allows one to form a ready to use twist-on wire connector or a ready to use sealant containing twist-on wire connector by molding a shell around a coil either before or after sealant is injected into the coil in the shell.

Figure 1:
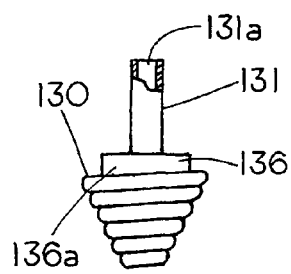
FIG. 1 shows a twist-on wire connector coil.

FIG. 1 shows an example of a coil 130 which has a spiral or tapered configuration and is formed by bending a wire into a coil although other methods as well as materials may be used to form the coil for the twist-on wire connector. If wire is used to form the coil 130, preferably square wire is used in the coil formation since the corners of the square wire can form threads for engaging the electrical wires that are ultimately joined in the twist-on wire connector. As used herein the term coil refers to the wire-engaging member that is normally found in twist-on wire connectors where a wire connection is formed by twisting the wires with respect to the twist-on wire connector. As illustrated in U.S. Pat. No. 5,771,578 the coils have been mechanically inserted into a shell.

The prior art shows that if a sealant containing twist-on wire connector is being formed optical sensors have been used to determine if the coil insertion has been successful. If successful a cap is then mechanically engaged with the shell and a sealant can be injected into the cavity of the coil to form a sealant containing twist-on wire connector. In the process described herein the mechanical insertion of a coil or a cap into the shell can be eliminated. In addition the need to use an optical sensor to determine if the coil has been properly inserted into the shell or if the end cap has been properly inserted into the shell can also be eliminated.

FIG. 1 shows the coil 130 supported by a fixture 160 comprising a removable plug 136, which is affixed to a hollow stem 131. In the embodiment shown a portion of the outer laterally cylindrical surface 136a of plug 136 is in engagement with a portion of an interior thread or interior protrusions on coil 130 to either frictionally or threadingly support the coil 130 thereon to enable handling of coil 130 through manipulation of stem 131. In the embodiment shown plug 136 contains a central passage (not shown) therein that is in alignment with a central passage 131a in hollow stem 131 to form a sealant injection passage into an interior cavity or pocket in the coil 130. Although a hollow stem is shown a solid stem may be used, in those instance sealant may or may not be used and if sealant is used the sealant may be injected into the twist-on wire connector coil after molding of the shell of the twist-on wire connector. Coils used in twist-on wire connectors are extensively known and used in the art of making twist-on wire connectors and the coils may take various shapes or configurations but regardless of shape or configuration they share the feature of enabling electrical wires inserted therein and rotated to be brought into electrical contact with each other as the wires are twisted with respect to the coil.

Figure 2:
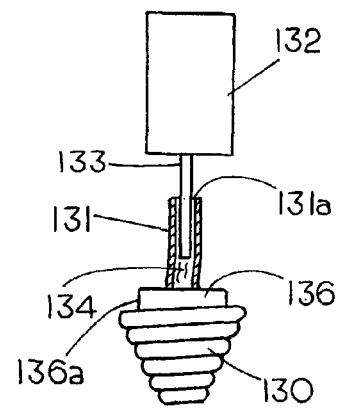
FIG. 2 shows a twist-on wire connector coil being injected with sealant.
Figure 5:
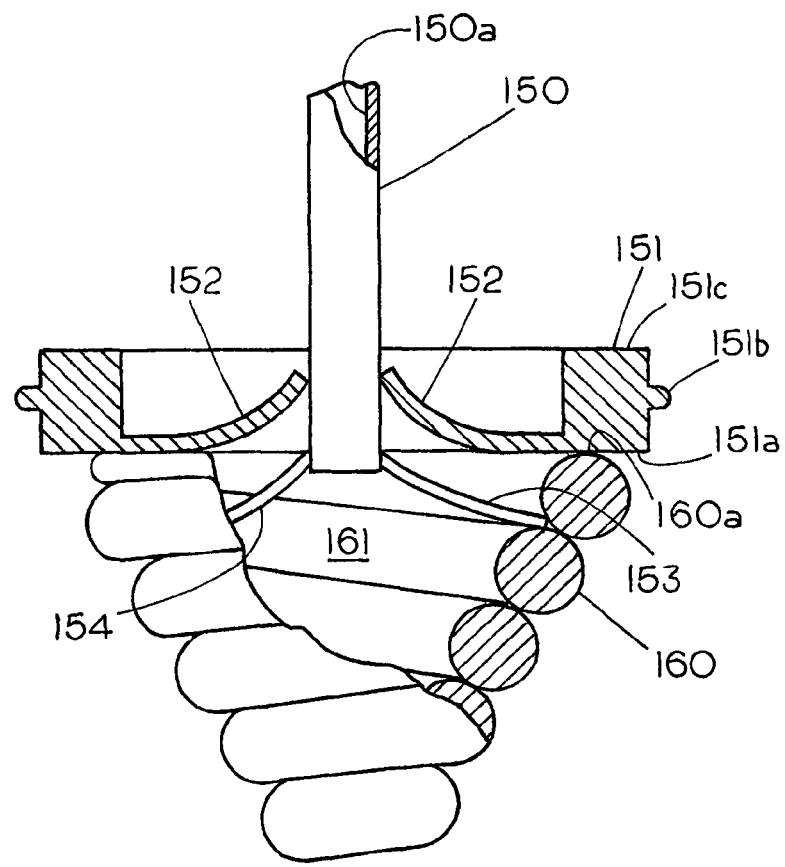
FIG. 5 shows a sectional view of a fixture supporting an end cap and a coil.

FIG. 2 shows the plug 136 directly engages and supports the coil 130 to allow one to manipulate coil 130 through stem 131, however, the stem may also support an end cap 151 as illustrated in FIG. 5. As an alternate method the plug 136 may be an end cap that can be removed from the stem 131 after molding of a shell about the coil 130. In another method the plug 136 may be permanatently affixed to hollow stem 131 so that when plug 136 and the hollow stem are removed from the coil it leaves a molded twist-on wire connector without an end cap. Each of the above options and variations of may be employed in the herein described mold or the method of molding a twist-on wire connector or molding a twist-on wire connector containing a sealant.

FIG. 1 and FIG. 2 show the top of a coil-engaging plug 136 attached to a hollow stem 131, which extends upward from plug 136. Hollow stem 131 forms a dual purpose, first, hollow stem 131 and plug 136 comprise a fixture 160 to support the coil 130 thereon to enable manipulation and positioning of coil 130 in a mold cavity, second the hollow stem 131 permits injection of sealant into a cavity in the coil 130 when the coil 130 is mounted on plug 136. Plug 136 may include a lip, an edge or a spiral thread on cylindrical surface 136a for engaging an interior thread on coil 130 although other methods of supporting the coil may be used, without departing from the spirit and scope of the invention.

FIG. 2 shows that with the coil 130 suspended and supported by hollow stem 131 sealant 134 can be injected into a cavity or pocket in the coil through a sealant injection tube 133, which is connected to a sealant source 132. In the embodiment shown either or both the coil 130 and the sealant source 132 can be manually supported by an operator who can bring the coil 130 and sealant injection tube 133 into position whereby the sealant 134 can be injected into the cavity or pocket in the coil 130. Also if desired either or both the coil 130 and sealant source 132 may be mounted to a common support.

Figure 3:
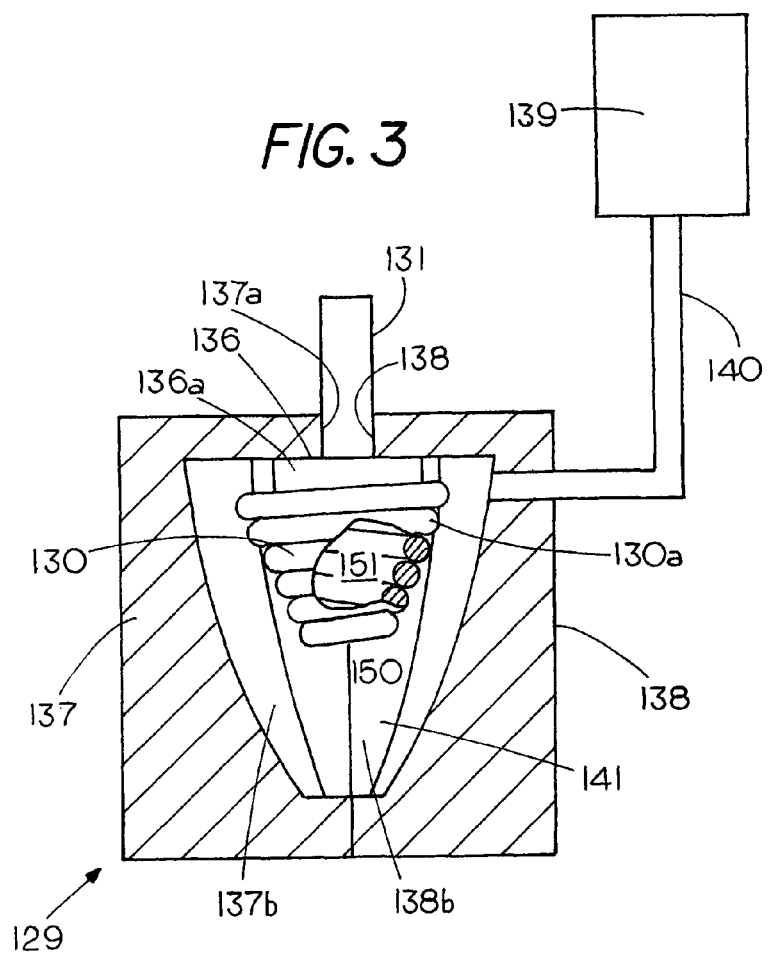
FIG. 3 shows a twist-on wire connector coil wire supported in a twist-on wire connector mold.

FIG. 3 shows the coil 130, which is supported by plug 136 and stem 131, positioned entirely and concentrically within a split mold 129 comprising a first laterally separable mold part 137 and a second laterally separable mold part 138 which when placed around the coil 130 form a shell cavity 150 for molding of a shell directly to and around shell coil 130. Coil 130 is shown partially in section to reveal cavity or pocket 151 therein. As shown in FIG. 3 the invention includes the step of placing a coil 130 in the mold, preferably placing a coil 130 in the mold 129 where an exterior surface 130a of the coil 130 forms a portion of a shell cavity wall and shell mold surfaces 137b and 138b form a further portion of the shell cavity wall. Thus the twist on wire connector mold 129 having mold parts 137 and 138 and coil 130 form a shell mold cavity 150 for in situ formation of a ready to use twist-on wire connector.

Figure 4:
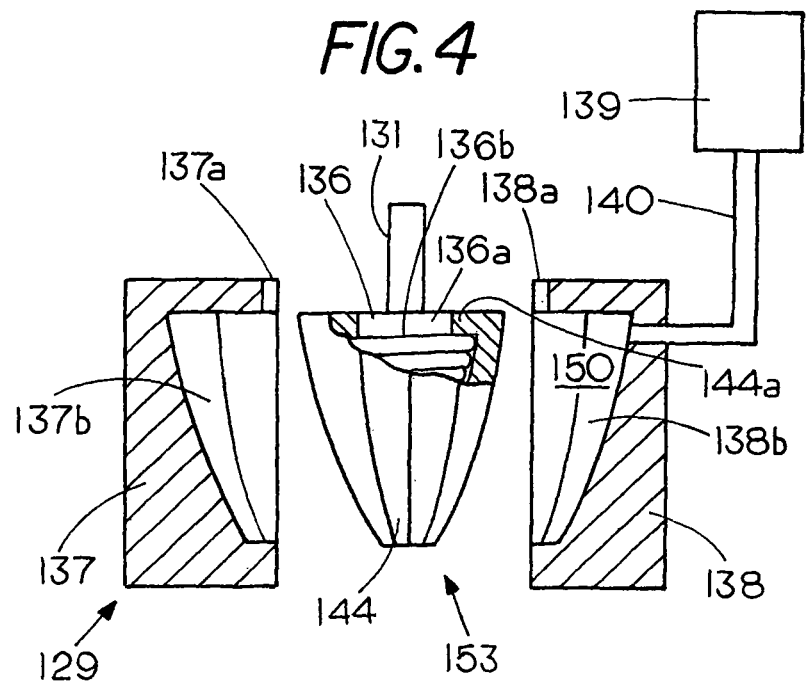
FIG. 4 shows a twist-on wire connector formed through a process of molding a shell about a twist-on wire connector coil.

FIG. 4 show mold part 137 and mold part 138 are laterally separable to permit insertion of coil 130 and plug 136 as well as laterally separable so as to facilitate removable of coil 130, stem 131, plug 136 and an in situ molded twist-on wire connector shell 144 from mold 129. The hollow stem 131, which is attached to plug 136, extends upward from open end of coil 130 with stem 131 and plug 136 preventing molten material from accessing the cavity in the coil 130 as well as to support the coil 130 during the molding of shell about the coil 130. While a split mold 129 with laterally separable mold parts is described herein other types of molds, which allow for removal of the molded part may be used. For example, a mold where a plug has sufficient width to form a top boundary of the mold. In those cases the twist-on wire connector can be ejected from the mold without having to separate the mold parts.

In the embodiments shown in FIG. 3 and FIG. 4 the friction between the outer surface of stem 131 and the mold surfaces 137a and 138a holds the stem 131 and the coil 130 in the top portion of the mold as shown in FIG. 3. Other methods of supporting the stem or the coil 130 are available including supporting the coil 130 with severable or retractable supports. With coil 130 supported by plug 136 and stem 131 and the mold parts 137 and 138 located in the position shown in FIG. 3 one can inject moldable material, such as a plastic material, into twist-on wire connector shell cavity 150 to form a molded shell around coil 130 where mold surface 137b and 138b and coil surface 130a form the surface boundaries for the shell 144 (FIG. 4). Molded material is typically an electrically insulating polymer plastic material. For example, one can inject molten plastic from a molten plastic source 139 through inlet passage 140 and into cavity 150. When the molten plastic cools it solidifies to form a hard shell 144 that is mechanically locked around the protrusions in the coil surface 130a as illustrated in FIG. 4. In the example shown the coil 130 is in a coaxial position with respect to cavity 150 to enable the coil to be centrally positioned within the molded shell when the molded shell 144 is removed from the mold although non coaxial positioning of coil 130 and molded shell 144 may be used. In the example shown coil 130 is mechanically locked to the molded shell through protrusions on coil surface 130a although other methods of securing the coil to the molded shell may include adhesives, or the like which may for example be placed on the coil surface 130a prior to molding the shell about the coil 130.

FIG. 4 also shows the step in the manufacturing process wherein the mold parts 137 and 138 are laterally separated revealing shell mold surface 137a and shell mold surface 138a. During the molding process, as illustrated in FIG. 3, the mold surfaces 137a and 138a are in engagement with the exterior of hollow stem 131 to maintain the coil 130 in a molding position. As can be seen in FIG. 3 the entire coil 130 is located in the cavity of the mold 129 and is spaced from mold surfaces 137b and 138b. In FIG. 4 twist on wire connector shell 144, having an annular lip 144a which is shown encompassing the top end 136b of the coil 130 to mechanically lock coil 130 in shell 144.

Figure 4A:
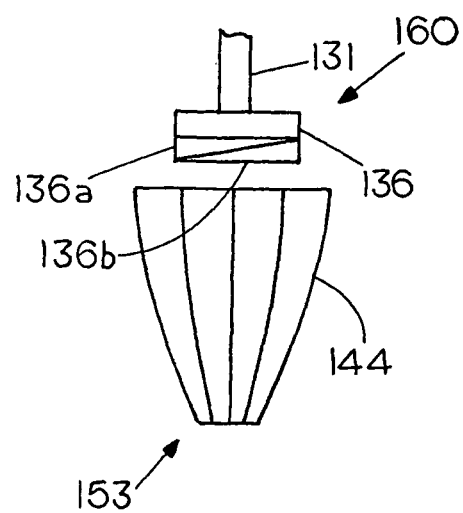
FIG. 4A shows a fixture being removed from the molded shell of a twist-on wire connector.

FIG. 4A illustrates the removal of stem 131 and plug 136 from the wire connector shell 144 leaving a finished product which may be either a ready to use twist-on wire connector or a ready to use sealant containing twist-on wire connector.

As illustrated in the Figures the process includes the method of making a ready to use twist-on wire connector or a ready to use sealant containing twist-on wire connector which comprises the steps of supporting a coil 130; positioning the coil in mold 129 having a mold cavity 150 in the shape of a twist-on wire connector shell 144; injecting a sealant into a cavity in the coil if one wants a sealant containing twist-on but not injecting a sealant into a cavity in the coil if one wants a twist-on wire connector without sealant. By injecting molten electrically insulating material into the mold cavity 150 one can form a shell 144 about the coil 130. One can then remove the shell 144 and the plug 136 with coil 130 from the mold. Once removed one can separate the plug 136 from the coil 130 and shell 144 as illustrated in FIG. 4A.

A feature of the process is that in the making of the sealant containing twist-on wire connectors the injection of sealant into the coil can be done either before, after or during the molding of the shell around the coil to form a ready to use sealant containing twist-on wire connector or alternately a sealant may not be injected to provide a conventional ready to use twist-on wire connector without sealant.

A further feature of the invention is a mold for the in situ formation of a twist-on wire connector without the need to mechanically insert a coil into an electrically insulating shell. A reference to FIG. 3 and FIG. 4 shows mold 129 for making a ready to use twist on wire connector 153. Twist-on wire connector mold 129 includes a first mold part 137 having a first exterior shell mold face 137b and a second mold part 138 having a second exterior shell mold face 138b forming a cavity 150. Located in cavity 150 is a coil 130, which is shown partially in section, to reveal an interior coil pocket 151. The outside surface 130a of coil 130 forms an interior shell mold face. A plug 136 blocks the interior coil cavity or pocket 151 to prevent access of moldable material therein. Plug 136 also includes an interior shell mold face 136a with the plug 136, the first mold part 137 and the second mold part 138 are each separable from the coil 130 (FIG. 3 and FIG. 4) to form a twist-on wire connector shell 144 with the coil molded to shell 144 when molten electrically insulating material is injected into cavity 150 and allowed to solidify to form an electrical insulating shell 144 which is secured to the coil 130 by the undulating protrusions on exterior coil surface 130a.

FIG. 5 illustrates an alternate fixture and method wherein two components namely an end cap 151 and a coil 160 are supported by stem 150. End cap 151 and coil 160 are positionable inside a mold prior to injection molten material into the mold for the in situ formation of a shell around the coil 160. A hollow stem 150, which includes a plug comprised of lateral foldable extensions 153 and 154, which are shown in engagement with the interior surface of spiral coil 160 to support the coil thereon. While two extensions 153 and 154 are shown more or less extensions could be used to provide temporary engagement and support for coil 160 during the molding process as well as to allow one to position coil 160 through manipulation of stem 150. Located on top of coil 160 is an end cap 149 for a twist-on wire connector, which is typically abutted against an underside 151a of end cap rim 151 to prevent molten material from flowing into the cavity of the coil 160 during the molding of the shell around the coil. Similarly, top surface 151c of cap 151 can be abutted against the top of the mold to prevent molten shell material from flowing into the end cap.

Figure 6:
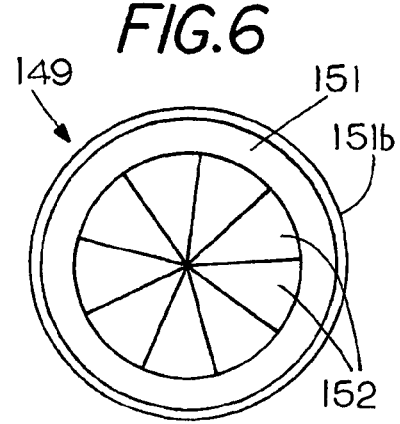
FIG. 6 shows a top view of an end cap for a twist-on wire connector.

A top view of typical end cap 149 is shown in FIG. 6 and comprises an outer annular rim 151 with triangular shaped resilient flaps 152 extending central inward and a peripheral protrusion or bead 151b that enable the end cap to be mechanically interlocked with the shell when the shell is molded about the end cap. As illustrated in FIG. 5 the resilient flaps flex to allow insertion of stem 150 threrethrough.

When an end cap 149 is used in the molding process the hollow stem 150 is inserted through the bottom of end cap thereby causing the resilient flaps 152 to flexibly engage the exterior side surface of the hollow stem 150 to hold the end cap 149 in position proximate the coil 160. In addition the end cap 149 can also block the flow of molten material into the pocket 161 in coil 160 during the insert molding process by abutting the top surface 160a of the coil against the under surface 151a of rim 150. Once the molten material is injected around the coil one can remove stem 150 from the coil 160 and end cap 151 by pulling upward on stem 150 which cause extensions 153 and 154 to disengage from coil 160 and pass through the resilient flaps 152. A feature of the process is that one can inject sealant into the pocket or cavity 161 in coil 160 through stem passage 150a which can be done either before, after or during the molding of the shell around the spiral coil. That is the cavity or pocket of the coil after removing the coil with the shell from the mold. While the injection of sealant is done through a fixture supporting the coil one may elect to inject the sealant through other methods after the molded shell and coil are removed from the shell.

We claim:

1. A twist-on wire connector mold for in situ formation of a ready to use twist-on wire connector without further assembly steps outside the mold comprising:

a first mold part having a first shell mold face;

a second mold part having a second shell mold face with said first shell mold face and said second shell mold face forming a cavity therein;

a coil located in said cavity, said coil having a pocket and a shell mold face; and a plug, said plug blocking accesses to the pocket of said coil whereby said plug, said coil shell mold face, said first shell mold face and said second shell mold face form a shell mold cavity to enable formation of a molded twist-on wire connector shell about the coil when a moldable material is injected into the shell mold cavity, said plug having a hollow stem for injection of a sealant into the pocket in the coil.

2. The twist-on wire connector mold of claim 1 wherein said first mold part and said second mold part are separable to release the twist-on wire connector shell with the coil therein.

3. The twist-on wire connector mold of claim 1 wherein the plug includes a shell mold face and said plug abuts against a portion of the first shell mold face or the second shell mold face or both.

4. The twist-on wire connector mold of claim 1 wherein the coil comprises an electrically conductive metal and the moldable material comprises an electrically insulating material.

5. The twist-on wire connector mold of claim 1 wherein the coil is located coaxial with said cavity in said coil.

6. The twist-on wire connector mold of claim 1 wherein the coil shell mold face includes a protrusion thereon for mechanically retaining the coil in the twist-on wire connector shell.

7. The twist-on wire connector mold of claim 1 wherein the pocket of said coil include a sealant.

* * * * *